March 5, 1940.   A. B. C. DAHLBERG   2,192,284
METHOD OF CONSTRUCTING BITUMINOUS ROADS AND THE LIKE
Filed March 24, 1936
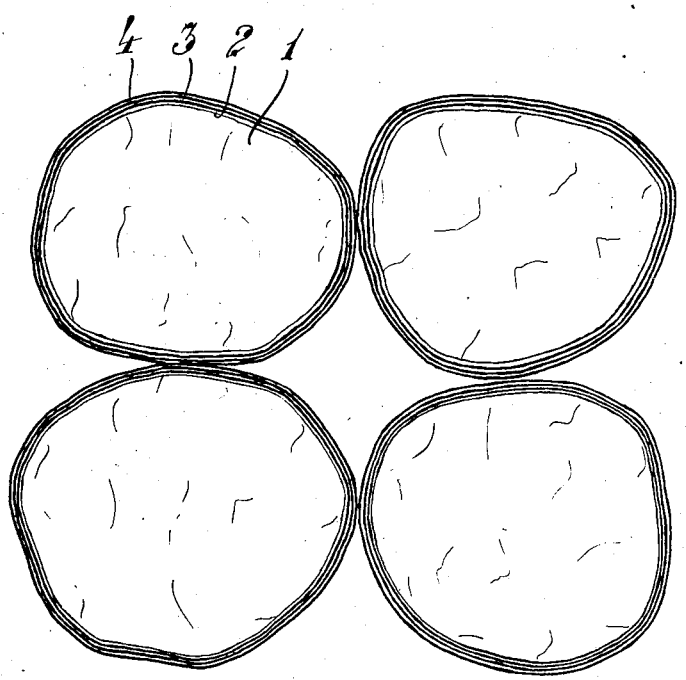
Inventor
Amund B. C. Dahlberg
by Sommers & Young
Attorneys Patented Mar. 5, 1940

2,192,284

UNITED STATES PATENT OFFICE 2,192,284

METHOD OF CONSTRUCTING BITUMINOUS ROADS AND THE LIKE

Amund Birger Carl Dahlberg, Appelviken, Sweden, assignor to A. Johnson & Co., Stockholm, Sweden Application March 24, 1936, Serial No. 70,701
In Sweden November 27, 1934

4 Claims. (Cl. 94—23)

This invention relates to improvements in the art of bituminous road making and the like. A principal object of the invention is to provide a new method of preliminarily treating the surfaces to which the bitumen is to be applied so as to improve the wetting and the bond between said surfaces and the bitumen binder and to render the bond highly resistant against water. More particularly, the object of the invention is to bring about a chemical binding between the bitumen and the surfaces to which the latter is applied, by means of an intermediate layer capable of chemically attacking said surfaces, which layer is applied in a specific manner previous to the application of the bitumen.

With this and other objects in view the invention consists, chiefly, in first treating the surfaces to be bonded by means of bitumen with basic substances, such as compounds of calcium, aluminium or magnesium, etc., capable of effecting a molecular orientation of the acid molecules in the surfaces treated by forming surface-chemical compounds, as for instance calcium silicate, and then applying saponifiable substances, such as oleic acid, forming with the surface-chemical compound previously formed a strongly adhering layer which is substantially insoluble in water, as for instance calcium-silicate-oleate.

My improved method is especially intended for use in connection with materials rich in silica which are generally used in road building and also in connection with roads built up with weakly acid binding materials, such as asphalt.

The coating created on the surfaces treated according to the invention greatly reduces the adhesion of water to said surfaces while the adhesion of bitumen is greatly increased. The chemical binding of the coating to the surfaces forms a guaranty against the loss of said adhesion properties in the performance of the treatment.

After the preparation of the said coating, which theoretically only needs to have a thickness corresponding to the magnitude of a few molecules for securing the effect aimed at, bitumen in molten state or dissolved in a suitable solvent is added.

The basic compounds which are to be used for the first treatment of the surface to be bound by bitumen are, preferably, calcium hydroxide, or salts of calcium, magnesium, or aluminium, but also other metal compounds capable of chemically attacking the surfaces and of forming a coating insoluble in water may be used.

In manufacturing bituminous road making compositions containing gravel, sand or other mineral substances rich in silica and other substances of a substantially acid character, the coating of the mineral particles with the basic metallic compound may be performed by treating the mineral mass with a powder or by soaking or sprinkling it with a solution or suspension of the said metallic compound or in any other suitable manner. The chemical attack of the basic compound consists in the formation on the surfaces of the mineral particles of an extremely thin layer of firmly adhering chemical compounds of the basic substance added and the silica and other acid compounds of the mineral particles.

In the accompanying drawing an aggregate of stone pieces with coatings according to the invention is shown diagrammatically, the coatings being shown in an exaggerated scale in relation to the size of the stone pieces.

Referring now to the drawing, numeral 1 indicates aggregate pieces consisting for instance of granite gravel. Numeral 2 designates a thin film of a basic metallic compound capable of chemically attacking the surfaces of the pieces 1 in presence of water and of forming soap substantially insoluble in water with saponifiable substances. Said layer 2 may, for instance, consist of slaked lime supplied as thin milk of lime and afterwards dried. By the chemical attack of the basic metallic compound on the surfaces of the pieces 1 the innermost portion of the film 2 is converted to a thin molecular layer of salts strongly adhering to the surfaces of the pieces 1. Numeral 3 indicates another thin film covering the film 2 and consisting of a saponifiable substance, for instance, a saponifiable fatty acid. The film 3 may be formed by sprinkling the pieces with a solution of the fatty acid in a volatile solvent. On applying said solution it penetrates the film 2, said penetration being accompanied by a reaction between the fatty acid and the metallic compound as well as the salt layer on the pieces 1, by which metallic soaps insoluble in water are formed. Numeral 4 indicates a layer of asphalt or other bituminous substance. Said layer is applied after the saponification of the fatty acid and is firmly secured to the stone pieces 1 by the preparatory treatment of the surfaces of the latter by means of the reagents forming the films 2 and 3.

For a reliable adhesion of the metallic compound to the surfaces of the mineral particles a certain time is required. Experiments have proved that a beginning of the adherence occurs after about 15 minutes, a reliable and sufficient adhesion is, however, attained only after a longer time, for instance one or more hours. A longer period of storage than one day is not required but on the other hand the result aimed at is not impaired if a longer time is allowed for the basic metal compound to perform the adjusting of the molecules in the surfaces of the stone material as well as in the basic coating itself. This fact is of great importance in the practical performance of the process inasmuch as the result aimed at is safely attained only if after the application of the metal compound the subsequent treatment is somewhat delayed. If the interval allowed is too short chiefly a soap will be formed with the metal of the basic substance, for instance calcium oleate, but no silicate compound of said metal, for instance calcium silicate, or in any case too small a quantity of the silicate compounds for securing the effect aimed at will be formed.

As soap forming substances fatty acids, oleic acids, glycerides and resins, such as rosin, may be used. Such substances are dissolved in organic solvents or are used as emulsions in water with such dilution that they can form sufficiently thin but fully covering coatings on the mineral particles.

After the addition of the soap forming substances, bitumen, asphalt, tar or mixtures of such substances in molten state or dissolved in light petroleum or other suitable solvent are added.

Between the preparatory treatment and the addition of the bitumen, the stone material may be treated with a solvent for bitumen, for instance petroleum, heavy benzine or benzol to improve the adhesion of the bitumen to the mineral particles. Said treatment can, if desired, also take place after the supply of the bitumen.

Example.—1,000 kgs. of granite gravel with a grain size of 5 to 15 mm. are soaked or sprinkled with 10 liters of lime milk containing 1 kg. of dry-slaked lime, whereupon a mixing operation, if required, takes place for uniformly distributing the lime milk on the surfaces of the mineral particles. The material is then stored 8 to 12 hours during which a surface reaction takes place between the lime and the stone material causing the formation of calcium silicate, whereupon the material, if required, is dried by heating and subsequently cooled. After the storing 3 kgs. of light petroleum containing 10% of oleine in solution is added in a mixer and finally 50 kgs. of bitumen having a penetration of 80 to 100, heated to 100° C. is added and thoroughly mixed with the stone material.

The bitumen composition thus manufactured can immediately be applied to a road or other surface to be covered therewith.

In treating an ordinary gravel road with a bituminous binder according to the invention the road surface is first treated with a basic substance, as for instance lime powder or lime milk which, preferably, is mixed with the top layer of the road by means of a road planer or the like. After some time, for instance 15 minutes or, preferably, after some hours or a day, the road surface is sprinkled with a solution of a fat, an ester or a resin or other saponifiable substance in a suitable solvent, for instance benzine, benzol, or petroleum, which solution likewise may be mixed with the top layer material by means of a road planer. As soon as the saponifiable substance has reacted with the lime the road surface is ready for the application of the bituminous binder which is supplied in a hot molten state or dissolved in a suitable solvent. The supply and the mixing of the lime and the saponifiable substance as well as of the bitumen binder can take place in dry weather as well as in damp or rainy weather.

The procedure is analogous when a bitumen road is to be reconditioned or provided with a new cover of bituminous material.

When fresh stone material is to be supplied to a road together with bitumen, said material is treated in the manner above described either directly on the road surface or it may be subjected to a preparatory treatment at the gravel-pit or the stone-breaker in the manner above described. Such preparatory treatment may take place even long beforehand, for instance during the winter when the material is to be used in the next summer. In such case the stone material can be treated with the basic metal compound only or with such compound as well as with the saponifiable substance to form a coating insoluble in water on the stone particles which render them hydrophobe.

My improved process is valuable in connection with all acid stone materials, that is, particularly those which contain a great percentage of silica. In fact, practically all stone materials used in road making with the exception of limestone are acid in said sense.

My improved process renders it possible not only to make bituminous road compositions and covers which will not be impaired by water squeezing in between the stone material and the bituminous cover but an essential feature of the process is that it can be carried out in damp and rainy weather and even in water.

What I claim is:

1. The method of bitumenizing roads containing mineral material having itself an acid character, comprising, first treating the top surface of the road when wet with a metallic compound capable of chemically attacking the acid mineral material to form a salt on the surfaces thereof, capable of forming soap substantially insoluble in water with saponifiable substances and also capable itself of forming a water-insoluble soap with a saponifiable substance, leaving the said metallic compound to react with the acid mineral bodies to form a thin coating of salt thereon, after the chemical reaction spreading a saponifiable substance in liquid condition on the road, and finally applying a bitumen binder.

2. In a method for improving the bond between bitumen and mineral material having itself an acid character, for road construction and the like, the steps comprising, first applying to the surfaces of the acid mineral bodies in wet condition a basic metallic compound capable of chemically attacking said surfaces in presence of water to form a metallic salt capable of forming soap practically insoluble in water with saponifiable substances, leaving said basic compound in contact with said acid material for sufficient time to react therewith to form a thin coating of said salt thereon, and then applying to the mineral bodies a saponifiable substance capable of forming soap practically insoluble in water with the basic compound and with the salt coating of said bodies preparatory to the addition of the bitumen binder.

3. In a method for improving the bond between bitumen and mineral material having itself an acid character for road construction and the like, the steps comprising, applying to the surfaces of bodies of the mineral material, water and a basic metallic compound capable, in the presence of water, of chemically attacking the surfaces of the acid mineral bodies to form water insoluble salts, capable of forming soaps that are substantially insoluble in water with saponifiable substances, allowing said metallic compound to attack the surfaces of the material of acid character for at least fifteen minutes to form thin coatings of said salts on said bodies, and then applying to the coated surfaces of said bodies a substance capable of forming a soap substantially insoluble in water with the coatings of salts, preparatory to the addition of the bitumen binder.

4. The method of bitumenizing mineral road aggregate of acid character comprising applying to the aggregate when wet a coating of slaked lime which is itself capable of forming water-insoluble soap with oleic acid, and which chemically attacks the acid aggregate to form thin layers of a salt capable of reacting with oleic acid to form a water-insoluble soap, allowing the lime to act on the aggregate for at least fifteen minutes, then applying oleic acid to the coated aggregate to form water-insoluble soaps with the lime and with the salt produced by the reaction between the lime and aggregate, and applying bituminous road binder which forms a close adhesion to the soaps and thus also to the mineral aggregate.

AMUND BIRGER CARL DAHLBERG.